(12) United States Patent
Wooten et al.

(10) Patent No.: US 7,249,927 B2
(45) Date of Patent: Jul. 31, 2007

(54) STORAGE RACK FOR A VEHICLE

(75) Inventors: Donald W. Wooten, Dallas, TX (US); Robert E. Reed, Jr., Dallas, TX (US); Robert F. Fisher, Dallas, TX (US)

(73) Assignee: Tactical & Rescue Gear, Ltd., Plano, TX (US)

( * ) Notice: Subject to any disclaimer, the term of this patent is extended or adjusted under 35 U.S.C. 154(b) by 286 days.

(21) Appl. No.: 10/977,410

(22) Filed: Oct. 29, 2004

(65) Prior Publication Data

US 2005/0095103 A1    May 5, 2005

Related U.S. Application Data

(63) Continuation-in-part of application No. 10/687,982, filed on Oct. 17, 2003, now abandoned.

(51) Int. Cl.
*B62D 43/02* (2006.01)

(52) U.S. Cl. ............... 414/466; 414/463; 414/465; 224/42.12; 224/42.21; 224/42.24

(58) Field of Classification Search ........ 414/463–466; 224/42.21, 42.24, 42.26
See application file for complete search history.

(56) References Cited

U.S. PATENT DOCUMENTS

| 1,445,913 | A | * | 2/1923 | Roos ........................ 296/37.2 |
| 1,505,927 | A | * | 8/1924 | Bayne ........................ 414/464 |
| 1,506,833 | A | * | 9/1924 | Higginbotham ............ 414/465 |
| 1,808,042 | A | * | 6/1931 | Kennedy .................... 224/499 |
| 1,809,119 | A | * | 6/1931 | Haffke ..................... 224/42.13 |
| 1,849,855 | A |   | 3/1932 | Stutsman et al. |
| 1,974,599 | A | * | 9/1934 | Bradford .................... 224/485 |
| 2,063,598 | A |   | 12/1936 | Franklin |
| 2,377,149 | A | * | 5/1945 | Heil .......................... 414/463 |
| 2,433,169 | A | * | 12/1947 | Stephenson et al. ....... 296/37.2 |
| 2,819,004 | A | * | 1/1958 | Kubik et al. ............. 224/42.21 |
| 2,991,894 | A | * | 7/1961 | Walker ....................... 414/466 |
| 3,019,928 | A | * | 2/1962 | Mullins ...................... 414/463 |
| 3,301,450 | A | * | 1/1967 | Widner .................... 224/42.24 |
| 3,371,832 | A | * | 3/1968 | Sekino et al. ............ 224/42.21 |
| 3,387,754 | A | * | 6/1968 | Sinkey et al. ............ 224/42.21 |
| 3,507,514 | A | * | 4/1970 | Betz ......................... 280/164.1 |
| 3,613,971 | A | * | 10/1971 | Betz ............................ 224/486 |

(Continued)

FOREIGN PATENT DOCUMENTS

FR    2586992 A1 *  3/1987

(Continued)

*Primary Examiner*—Patrick Mackey
*Assistant Examiner*—Charles Greenhut
(74) *Attorney, Agent, or Firm*—Dunlap, Codding & Rogers, P.C.

(57) ABSTRACT

A storage rack connectable to a mounting structure of a vehicle for supporting a load, comprising a load supporting structure, a swing arm assembly, and a lift assembly. The load supporting structure is adapted to support the load when the load is associated with the load supporting structure. The swing arm assembly is connected to the load supporting structure, the swing arm assembly being attachable to the mounting structure of the vehicle. The lift assembly is associated with the load supporting structure for facilitating lifting of the load to the load supporting structure whereby the load can be supported by the load supporting structure and thus the vehicle.

16 Claims, 6 Drawing Sheets

U.S. PATENT DOCUMENTS

| | | | |
|---|---|---|---|
| 3,658,201 A * | 4/1972 | Williams et al. | 414/466 |
| 3,822,814 A | 7/1974 | Baldi | |
| 4,073,395 A * | 2/1978 | Clement | 414/462 |
| 4,155,472 A * | 5/1979 | Dansbury | 414/466 |
| 4,161,267 A * | 7/1979 | Morrison, Jr. | 224/42.24 |
| 4,241,858 A * | 12/1980 | Lawroski | 224/513 |
| 4,249,683 A * | 2/1981 | Park | 224/42.12 |
| 4,275,981 A * | 6/1981 | Bruhn | 414/462 |
| 4,312,620 A * | 1/1982 | Muschalek, Jr. | 414/466 |
| 4,410,117 A * | 10/1983 | Crawford et al. | 224/490 |
| 4,418,851 A * | 12/1983 | Ankeny | 224/504 |
| 4,483,468 A | 11/1984 | Lucas | |
| 4,485,945 A * | 12/1984 | Ankeny | 224/504 |
| 4,561,575 A | 12/1985 | Jones | |
| 4,679,717 A | 7/1987 | Hansen | |
| 4,709,840 A * | 12/1987 | Allen | 224/314 |
| 4,767,038 A * | 8/1988 | McVicar | 224/505 |
| 4,771,926 A * | 9/1988 | Anderson et al. | 224/42.13 |
| 4,817,834 A | 4/1989 | Weiler | |
| 4,850,518 A | 7/1989 | Salmon et al. | |
| 4,948,024 A * | 8/1990 | Warner et al. | 224/310 |
| 5,186,371 A * | 2/1993 | Jozefczak et al. | 224/42.21 |
| 5,333,766 A * | 8/1994 | Fisher | 224/42.21 |
| 5,871,327 A * | 2/1999 | McWha | 414/463 |
| 6,059,155 A * | 5/2000 | Young | 224/42.12 |
| 6,379,101 B1 * | 4/2002 | Breaux | 414/537 |
| 6,631,834 B2 | 10/2003 | Slovick | |
| 2002/0084298 A1 * | 7/2002 | Essig | 224/509 |
| 2004/0222261 A1 * | 11/2004 | Wilson | 224/509 |
| 2005/0095103 A1 * | 5/2005 | Wooten et al. | 414/463 |
| 2006/0182571 A1 * | 8/2006 | Hightower | 414/466 |

FOREIGN PATENT DOCUMENTS

| | | |
|---|---|---|
| FR | 2700995 A1 * | 8/1994 |
| JP | 02306887 A * | 12/1990 |

* cited by examiner

STORAGE RACK FOR A VEHICLE

CROSS-REFERENCE TO RELATED APPLICATIONS

This application is a continuation-in-part of the patent application identified by U.S. Ser. No. 10/687,982 filed Oct. 17, 2003, now abandoned the entire content of which is hereby incorporated by reference in its entirety.

STATEMENT REGARDING FEDERALLY SPONSORED RESEARCH AND DEVELOPMENT

Not applicable.

BACKGROUND OF THE INVENTION

Utility vehicles used by the military, such as High Mobility Multi-Purpose Wheeled Vehicles (HMMWV), also known as humvees, have long been used by the military to traverse jungles, deserts, mountains and other terrains. The tires on HMMWVs are known as "run-flat" tires which are capable of running for 30-40 miles after such tires have been punctured. For this reason, the HMMWV has not been provided with a spare tire in military use. However, in Iraq, HMMWVs are more susceptible to having flat tires while crossing the rough, uneven surfaces of these various terrains. The additional weight of armoured kits for protection has incredased wear on the already stressed tires, necessitating the need for an available spare tire to be installed on all models of the HMMWV.

Several configurations exist for the HMMWV. Most of the designs transport items and soldiers in the rear part of the HMMWV. The tailgate of the HMMWV can be lowered to a useful angle in order to easily access items stored in the rear. A storage rack has also been designed for carrying a spare tire on the HMMWV. This storage rack connects to the tailgate, but restricts somewhat the lowering of the tailgate, and therefore limits accessibility to items stored in the rear part of the HMMWV.

Military equipment is typically heavy and cumbersome. Equipment, such as tires for the HMMWV, should be able to be used by the range of male and female soldiers from the $5^{th}$ percentile to the $95^{th}$ percentile in size and strength. For example, a female soldier ranked in the $5^{th}$ percentile is able to lift approximately 44 pounds without potential injury. A tire and wheel suited for a HMMWV typically weighs approximately 165 pounds. Therefore, a female soldier ranking in the $5^{th}$ percentile would most likely be unable to lift a tire suited for a HMMWV in the event of a flat tire or emergency. Further, a storage unit suited for a HMMWV should be strong enough to support approximately 3-4 g's of the combined weight of an approximately 165 pound tire unit and the spare tire rack. Therefore, the storage unit should be able to withstand up to a 900 pound shock in each of the 3 axes of movement, i.e., vertical, lateral and longitudinal.

Because of the treacherous, uncertain, lengthy missions in which military personnel are assigned, the lack of storage space design on a humvee, the need for use of the tailgate, and the need of such a vehicle to transport heavy items, such as tires, without military personnel being injured, a need exists for an apparatus capable of storing and transporting items such as spare tires, gasoline, water, personal equipment, ammunition and other items typically used by the military and capable of allowing soldiers in the bottom percentiles of size and strength to stow and deploy these heavy items onto and off of the vehicle. It is to such an apparatus that allows for the loading, transportation, storage and unloading of items, such as spare tires, which the present invention is directed.

BRIEF DESCRIPTION OF THE SEVERAL VIEWS OF THE DRAWING

FIG. 4 is a perspective view of the storage rack having a lift assembly positioned in an extended position to form a ramp for loading the load, which in this example is shown as a tire.

FIG. 5 is another perspective view of the storage rack, wherein the load has been moved a distance upwardly on the ramp formed by the lift assembly.

FIG. 6 is a perspective view of the storage rack, wherein the load has been positioned on the load supporting structure of the storage rack.

FIG. 7 is a perspective view illustrating the lift assembly associated with the load supporting structure being in a substantially folded position.

DETAILED DESCRIPTION OF THE INVENTION

Figure 1:
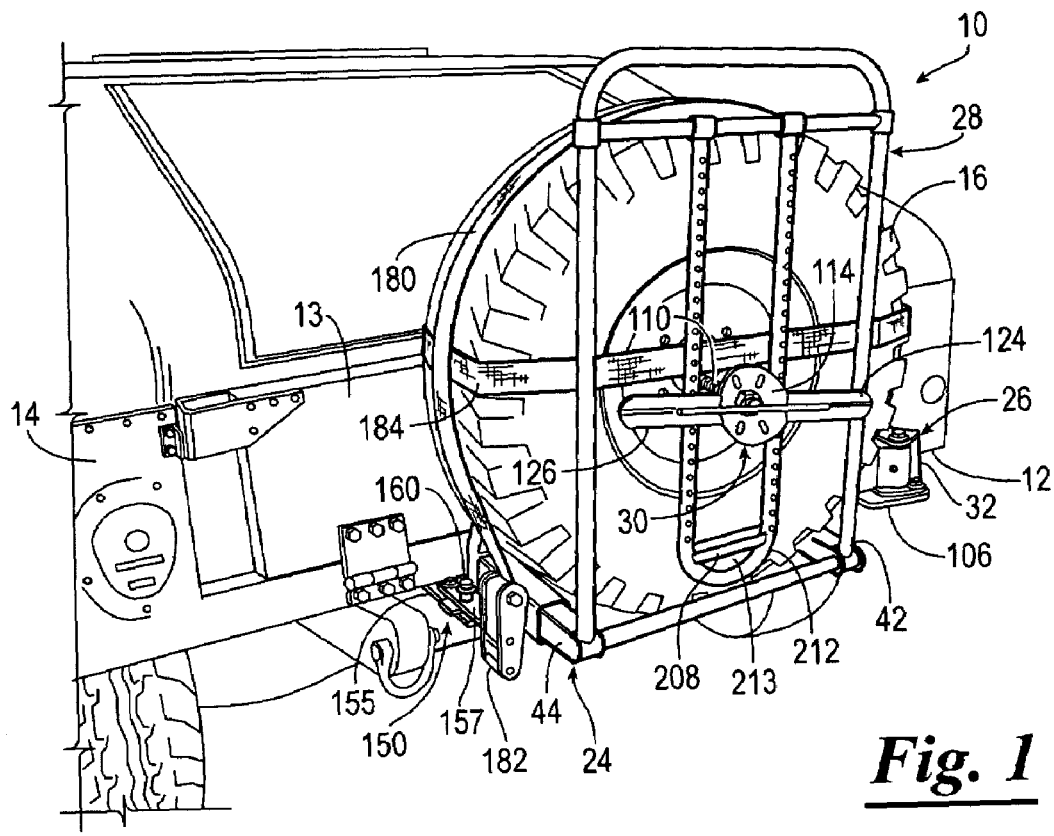
FIG. 1 is a perspective view of a storage rack constructed in accordance with the present invention, connected to a vehicle.

Referring now to the drawings, and in particular to FIG. 1, shown therein and designated by a reference numeral 10, is a storage rack constructed in accordance with the present invention. As will be described in more detail below, the storage rack 10 is connected to a mounting structure 12 of a vehicle 14 for supporting a load 16. In one preferred embodiment, the storage rack 10 is connected to the mounting structure 12 near a rear corner of the vehicle 14, and in particular adjacent to a tailgate 13 of the vehicle 14. For example, the mounting structure 12 can be a bumper or an external or internal frame of the vehicle 14, or extension thereof. However, it should be understood that the mounting structure 12 need not be adjacent to the tailgate 13, but can be any portion of the vehicle 14 which is capable of receiving the storage rack 10 and supporting the storage rack 10 and the load 16 as discussed herein. For example, the mounting structure 12 may in certain circumstances be a portion of a front, rear, top, bottom or side of the vehicle 14.

The vehicle 14 is typically a vehicle having the tailgate 13. In this instance, the vehicle 14 can be a truck, a military vehicle such as a humvee, a four wheeler, or a utility vehicle such as a golf cart having a truck bed. However, it should be understood that the vehicle 14 is not limited to a type of vehicle having a tailgate 13. For example, the vehicle 14 could be a snowmobile, a boat, a riding lawnmower, a motorhome, an automobile, or a ship.

The load 16 is preferably a tire having an attached rim. However, it should be understood that the load 16 can be any type of load or cargo which can be supported by the storage rack 10 and the vehicle 14 for transport from one location to another. It should also be understood that the storage rack 10 is capable of forming a cage for transporting virtually any object capable of being retained within the cage. For example, the load 16 could be a variety of items such as a duffle bag, a tent, fuel, water, food, ammunition, personal equipment or any other kind of load that is capable of being transported in the storage rack 10.

In general, the storage rack 10 is provided with a load supporting structure 24, a swing arm assembly 26, a lift assembly 28, and a locking assembly 30. The load supporting structure 24 is adapted to support the load 16 when the load 16 is associated with, e.g., placed on or in, or secured to, the load supporting structure 24. The lift assembly 28 is adapted to facilitate loading and unloading of the load 16 onto the load supporting structure 24. The lift assembly 28 can also cooperate with the load supporting structure 24 to retain at least a portion of the load 16 on the load supporting structure 24. The locking assembly 30 functions to secure the load 16 into the storage rack 10.

Figure 2:
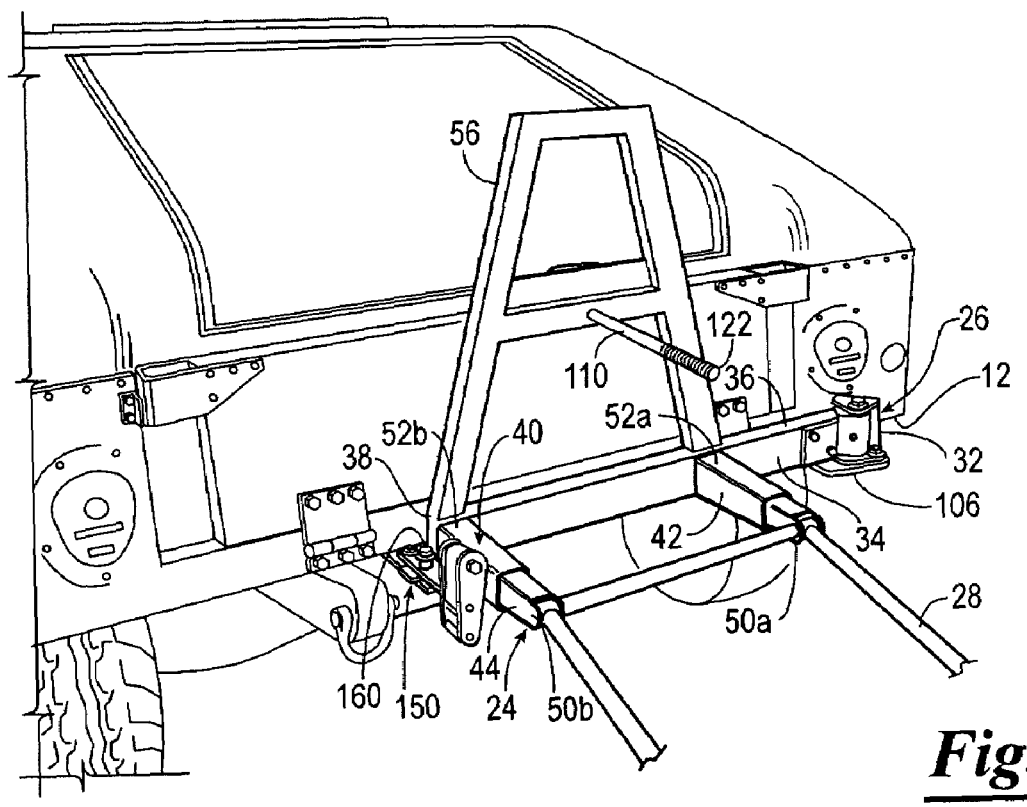
FIG. 2 is a perspective view of a load supporting structure constructed in accordance with the present invention and a swing arm assembly connected to the load supporting structure for attaching the load supporting structure to the vehicle and moving the storage rack in between an open and closed position.
Figure 3:
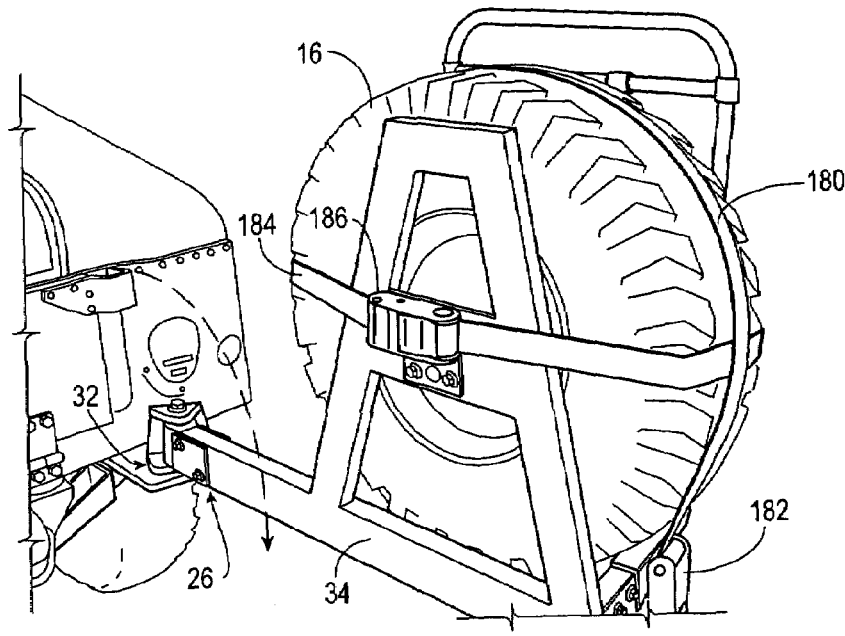
FIG. 3 is a perspective view of the storage rack wherein the storage rack is connected to the vehicle, and the storage rack is shown in the open position and a tailgate of the vehicle is moveable to a lowered position.

Preferably, the swing arm assembly 26 is connected to the load supporting structure 24, as best shown in FIG. 2. The swing arm assembly 26 is attachable to the vehicle 14 in a manner such that the storage rack 10 can be moved between an open position and a closed position. In general, when the storage rack 10 is in an open position, the tailgate 13 of the vehicle 14 is substantially unobstructed and capable of being placed in a lowered, or extended position, such as shown for example in FIG. 3. Then the tailgate 13 can be placed in a raised position, and the storage rack 10 placed in the closed position wherein the storage rack 10 is positioned near and spaced a distance away from the tailgate 13 of the vehicle 14, such as shown for example in FIG. 1. In the closed position, the storage rack 10 is generally in a position which is better suited for the loading and unloading of the load 16, and for the operation and movement of the vehicle 14.

In one preferred embodiment, the swing arm assembly 26 includes the hinge assembly 32 and an arm 34. The arm 34 has a first end 36 and a second end 38 with a distance extending there between. The hinge assembly 32 is connectable to the mounting structure 12 of the vehicle 14 and engages the first end 36 of the arm 34 so as to allow the turning or pivoting of the arm 34 generally about an axis 38 (see FIG. 9), which preferably is substantially parallel with the side of the vehicle 16. The arm 34 of the swing arm assembly 26 connects to the load supporting structure 24 such that the load supporting structure 24 also turns or pivots generally about the axis 38.

Figure 8:
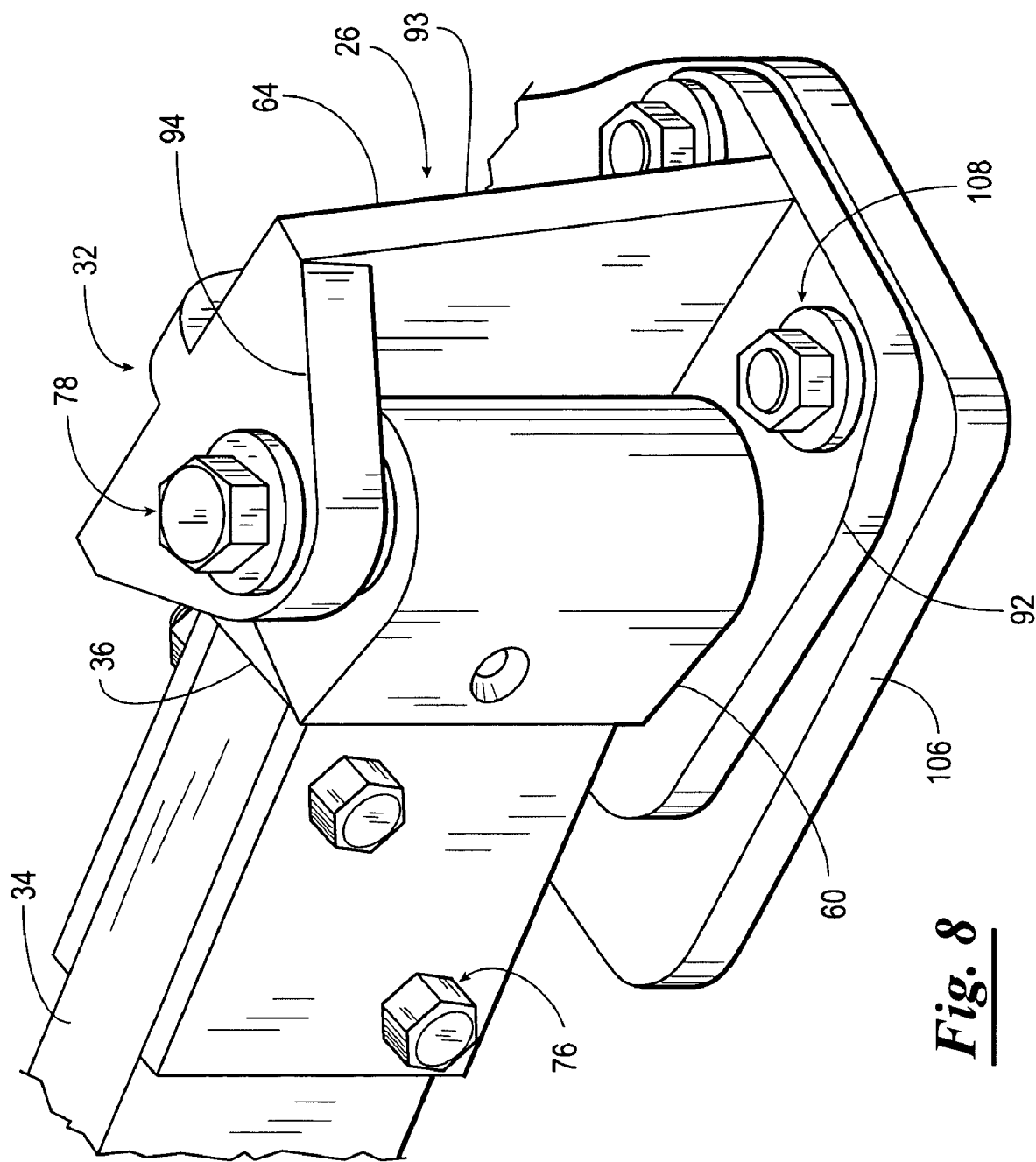
FIG. 8 is a side elevational view of a hinge assembly of the storage rack of the present invention which allows the rack to swing out from the back of the vehicle and provide unrestricted access to the tail gate.
Figure 9:
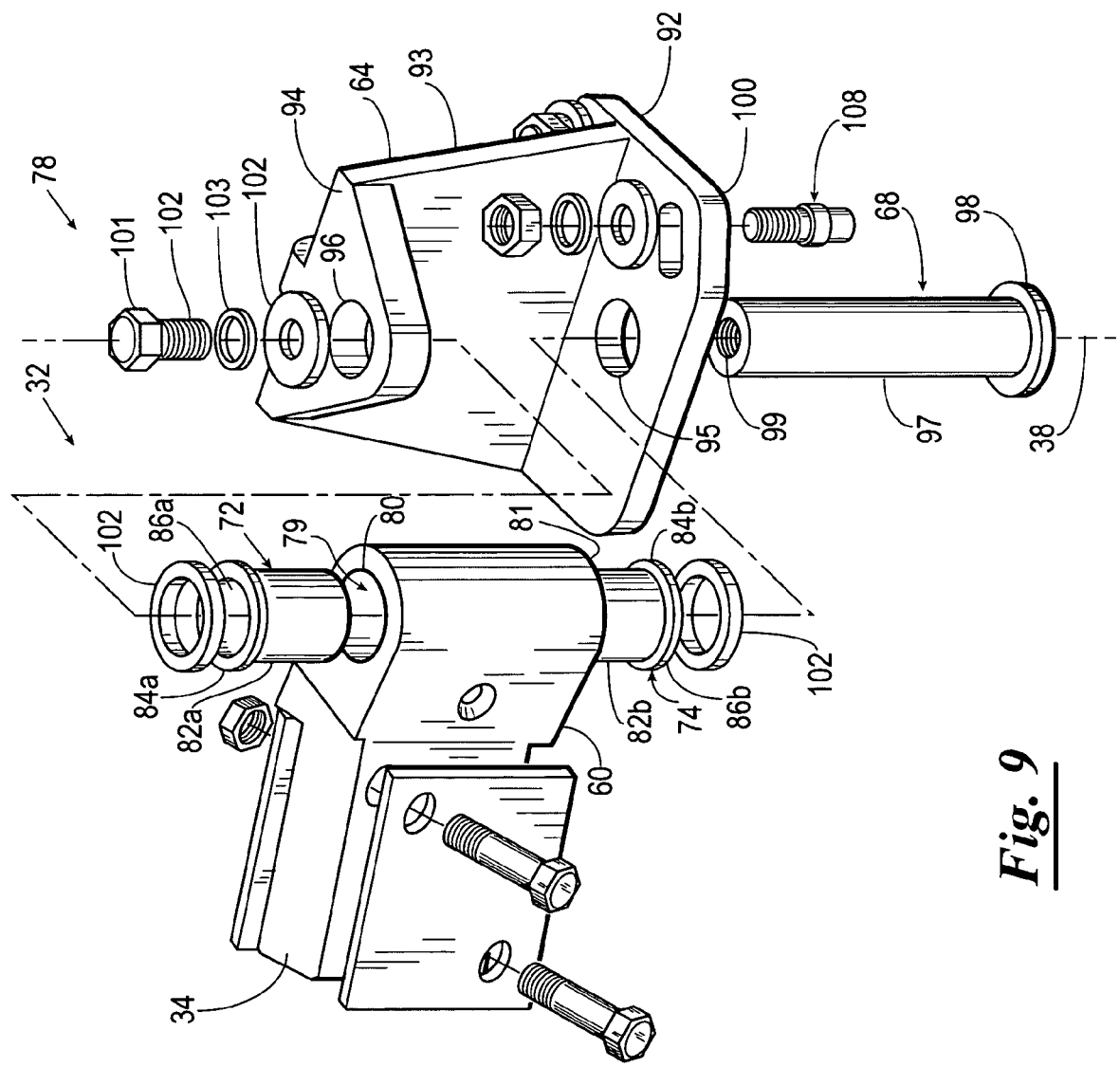
FIG. 9 is an exploded, perspective view of the hinge assembly depicted in FIG. 8.

In one embodiment, as shown for example in FIGS. 8-9, the hinge assembly 32 of the swing arm assembly 26 includes a pivoting member 60, a yoke 64, a pin 68, a first bushing 72, a second bushing 74, and a pin locking member 78. Generally, the pivoting member 60 is formed separately from the arm 34 and then connected to the first end 36 of the arm 34 by any suitable mounting assembly 76, such as welding, bolts, male-to-female connections, or the like. However, it should be understood that the pivoting member 60 and the arm 34 can be formed integrally to form a unitary structure.

The pivoting member 60 has an opening 79 formed there through which is adapted to receive at least a portion of the first bushing 72, the second bushing 74, and the pin 68. The opening 79 has a first open end 80 and a second open end 81. The opening 79 is preferably shaped as a cylinder. However, it should be understood that the opening 79 can be provided with other shapes.

The first bushing 72 and the second bushing 74 are preferably flanged bushings, which can be obtained from Garlock Sealing Technologies, Palmyra, N.Y. The first bushing 72 and the second bushing 74 are similar in construction and function. For this reason, only the first bushing 72 will be described in detail hereinafter. For purposes of clarity, the similar features of the first and second bushing 72 and 74 have been designated in FIG. 9 with the same number prefix, but different alphanumeric suffix. The first bushing 72 includes a sleeve portion 82a, a flanged portion 84a extending outwardly from the sleeve portion 82a, and an opening 86a formed through the sleeve portion 82a and the flanged portion 84a.

The sleeve portion 82a of the first bushing 72 has a configuration adapted to mate with the opening 79. The sleeve portion 82a has an outer diameter which is less than the diameter of the opening 79 of the pivoting member 60 so that the sleeve portion 82a of the first bushing 72 is insertable into the opening 79 of the pivoting member 60; however, the flanged portion 84a extending outwardly from the sleeve portion 82a of the first bushing 72 is sized so as to prevent passage of the flanged portion 84a of the first bushing 72a through the opening 79. The opening 86a of the first bushing 72 is preferably shaped as a cylinder. However, it should be understood that the opening 86a can be provided with other shapes.

The sleeve portion 82a of the first bushing 72 is inserted into the first open end 80 of the opening 79 of the pivoting member 60, and a sleeve portion 82b of the second bushing 74 is inserted into the second open end 81 of the opening 79 of the pivoting member 60.

The yoke 64 is desirably constructed of a very rigid material, such as for example iron. In one preferred embodiment, the yoke 64 has a bottom platform 92, a top platform 94 opposing the bottom platform 92, and a brace member 93 extending between the bottom platform 92 and the top platform 94 so as to form a generally C-shape with the bottom platform 92 and the top platform 94. The brace member 93 substantially maintains the bottom platform 92 and top platform 94 at a distance generally equal to a length of the pivoting member 60 and the thicknesses of the flanged portions 84a and 84b of the first and second bushings 72 and 74.

The bottom platform 92 has a hole 95 formed there through, and the top platform 94 has a hole 96 formed there through which is aligned with the hole 95 of the bottom platform 92. The holes 95 and 96 have a diameter less than the flanged portions 84a and 84b of the first and second bushings 72 and 74, respectively, so as to prevent passage of the flanged portions 84a and 84b therethrough. The pivoting member 60, and the inserted first bushing 72 and second bushing 74, are disposed in between the bottom platform 92 and the top platform 94.

The pin 68 has a shaft 97 and a shoulder 98 extending outwardly from the shaft 97. The shaft 97 of the pin 68 has a diameter which allows the pin 68 to be inserted up through hole 95 of the bottom platform 92, the opening 86b of the second bushing 74, the opening 79 of the pivoting member 60, the opening 86a of the first bushing 72, and the hole 96 of the top platform 94. The shoulder 98 of the pin 68 is sized to prevent passage of the shoulder 98 through the hole 95 of the bottom platform 92. Preferably, the bottom platform 92 is counterbored at a bottom surface 100 such that the shoulder 98 and the bottom surface 100 are generally flush.

Preferably, the pin 68 is maintained in a substantially static relationship with the yoke 64. The pin 68 generally defines the axis 38, and the pivoting member 60 is rotatable about the pin 68 so as to allow the pivoting member 60 (and connected arm 34) to pivot about the pin 68, and thus the axis 38.

The pin 68 of the hinge assembly 32 is desirably constructed of a very rigid material so that the pin 68 can support the weight of the arm 34, the load supporting structure 24, the lift assembly 28, the locking assembly 30, and/or load 16. In one preferred embodiment, the pin 68 is constructed of a high carbon content alloy and has a diameter in the range of about 1⅛ inches to 1¼ inches and a length of about 6 inches. However, it should be understood that the pin 68 could be constructed of other types of rigid material and be different sizes. Further, to reduce wear and friction, the pin 68 preferably has a high surface finish and is coated with an anti-frictional lubricant, such as for example a teflon and lead based lubricant.

The pin 68 is adapted to receive the pin locking member 78. Once the pin locking member 78 engages the pin 68, the pin locking member 78 serves to prevent the pin 68 from moving from the yoke 64 once the pin 68 has been inserted through the yoke 64, first and second bushings 72 and 74, and the pivoting member 60. In one embodiment, the pin 68 has a threaded hole 99 formed axially through at least a portion of the shaft 97 of the pin 68 which is disposed opposite the shoulder 98 of the pin 68, and the pin locking member 78 is a threaded bolt having a head 101 sized to prevent passage of the head 101 through the hole 96 of the top platform 94. The pin locking member 78 also includes a threaded end 102 which can be screwed into the threaded hole 99 of the pin 68 so as to engage the pin 68. Also, if desired, a washer 103 can be placed under the head 101 of the pin locking member 78 to relieve friction and/or distribute pressure from the head 101 of the pin locking member 78.

In one embodiment, as the pin locking member 78 is screwed into the threaded hole 99, the shaft 97 of the pin 68 expands in the region adjacent the threaded end 102 of the pin locking member 78 screwed into the threaded hole 99, thus providing a more precise fitting between the pin 68 and the top platform 94. Further, the pin locking member 78 can be screwed into the threaded hole 99 such that the pressure of the head 101 on the top platform 94 and the pressure of the shoulder 98 of the pin 68 on the bottom platform 92 cooperate to form a "clamping" of the top platform 94, bottom platform 92, and the pin 68 so as to prevent movement of the pin 68 relative to the yoke 63.

Preferably, the hinge assembly 32 is constructed such that spacings between the pin locking member 78, top platform 94, first bushing 72, pivoting member 60, second bushing 74, bottom platform 92, and/or pin 68 of the hinge assembly 32 are minimized to reduce vibration, wear, friction, or stress points caused by the "play" in or movement of such components. Also, to further reduce spacings, which can result from for example manufacturing tolerances, the hinge assembly 32 can further include precision spacers 102, which can be for example washers of different sizes, which are insertable between the connections described above for the pin locking member 78, top platform 94, first bushing 72, pivoting member 60, the yoke 64, second bushing 74, bottom platform 92, and/or pin 68.

In one preferred embodiment, the hinge assembly 32 further includes a mounting plate 106 connected to the yoke 64 which can be attached to the mounting structure 12 of the vehicle 16. The mounting plate 106 is desirably constructed of a very rigid material, such as for example steel. The mounting plate 106 can be connected to the yoke 64 and mounting structure 12 of the vehicle 16 by any suitable mounting assembly 108, such as welding, bolts, or the like. Preferably, the mounting plate 106 is connected to the bottom surface 100 of the bottom platform 92 of the yoke 64 and serves to further prevent the pin 68 from moving from the yoke 64 once the pin 68 has been inserted through the yoke 64, the first and second bushings 72 and 74, and the pivoting member 60. However, it should be understood that the mounting plate 106 can be omitted and the yoke 64 of the hinge assembly 26 can be attached directly to the mounting structure 12 of the vehicle 14. In such an embodiment, the mounting structure 12 can also serve to further prevent the pin 68 from moving from the yoke 64. Also, although the mounting plate 106 is described as preferably being mounted to the bottom platform 92 of the yoke, the mounting plate 106 can also be connected to the top platform 94, the brace member 93, the bottom platform 92, or in combinations thereof.

Although the hinge assembly 32 of the swing arm assembly 26 has been described as including the pivoting member 60, the yoke 64, the pin 68, the first bushing 72, the second bushing 74, the locking member 78, and the mounting plate 106, it should be understood that the hinge assembly 32 can be any mechanism which allows the arm 34 of the swing arm assembly 26 to pivot substantially about the axis 38. For example, the hinge assembly 32 can include a butt hinge, a ball bearing assembly, or the like, so long as the hinge assembly 32 is attachable to the vehicle 14 and supports the weight of the storage rack 10 and the load 16.

The arm 34 of the swing arm assembly 26 is desirably constructed of a very rigid material so that the arm 34 can support the load supporting structure 24, the lift assembly 28, the locking assembly 30, and/or load 16 while the storage rack 10 is in the open or closed position. In one preferred embodiment, the arm 34 is constructed of 2 inch outside diameter steel square tubing with a ¼ inch sidewall. However, it should be understood that the arm 34 could be constructed of other types of rigid material, such as glass reinforced plastics, different sizes of square tubing, or different shapes or configurations of solid material or tubing.

The lift assembly 28 is associated with the load supporting structure 24 for facilitating lifting of the load 16 to the load supporting structure 24 whereby the load 16 can be supported by the load supporting structure 24 and thus the vehicle 14 when the swing arm assembly 26 connects the load supporting structure 24 to the vehicle 14.

As best shown in FIG. 2, the load supporting structure 24 is provided with a platform 40. The platform 40 of the load supporting structure 24 receives at least a portion of the load 16 and functions to support the load 16. The platform 40 preferably engages at least a portion of the load 16 to support the load 16. However, it should be understood that the platform 40 does not necessarily have to engage the load 16. Spacers, or other structures can be positioned in between the platform 40 and the load 16.

In one preferred embodiment, as shown for example in FIG. 2, the platform 40 is formed by a first bottom support member 42, and a second bottom support member 44. In this regard, the first bottom support member 42 and the second bottom support member 44 cooperate to form the platform 40. It should be understood that although the embodiment depicted in FIG. 2 only has the first and second bottom support members 42 and 44, the platform 40 could be formed by any number of bottom support members, such as one, three, five or the like.

The first bottom support member 42 and the second bottom support member 44 are similar in construction and function. For this reason, only the first bottom support member 42 will be described in detail hereinafter. For purposes of clarity, the similar features of the first bottom support member 42 and the second bottom support member 44 have been designated in FIG. 2 with the same number prefix, but different alphanumeric suffix. The first bottom support member 42 desirably has a first end 50*a* and a second end 52*a* with a distance extending there between. As will be discussed in more detail below, the first end 50*a* of the first bottom support member 42 is adapted to be connected to the lift assembly 28 of the storage rack 10.

The second end 52*a* of the first bottom support member 42 is rigidly connected to the arm 34 of the swing arm assembly 26 such that the first bottom support member 42 extends from the arm 34 of the swing arm assembly 26 at approximately a ninety-degree angle from the arm 34 and the axis 38. However, it should be understood that the first bottom support member 42 can be another shape, size, or configuration, such as for example an L-shaped or T-shaped bracket. Also, although the first bottom support member 42 is shown as extending from the arm 34 of the swing arm assembly 26, it should be understood that the first bottom support member 42 can be connected indirectly to the swing arm assembly 26. For example, spacers or other structures can be positioned in between the swing arm assembly 26 and the first bottom support member 42. Further, the angle at which the first bottom support member 42 extends from the arm 34 of the swing arm assembly 26 can vary.

In one preferred embodiment, the first bottom support member 42 and the second bottom support member 44 are spaced a distance apart, as shown in FIG. 2. In this instance, a portion of the load 16 (depending upon the shape of the load 16) extends between the first bottom support member 42 and the second bottom support member 44. However, it should be understood that a structure (not shown) can be positioned between the first bottom support member 42 and the second bottom support member 44, if desired. For example, the structure can be used for reinforcing the first bottom support member 42 and the second bottom support member 44, or for another purpose such as providing more specialized support to the load 16.

The platform 40 can further include at least one side support member 56, as shown best in FIG. 2. In this regard, the first bottom support member 42, the second bottom support member 44, and the side support member 56 cooperate to form the platform 40. In one embodiment, the side support member 56 is rigidly connected to the arm 34 of the swing arm assembly 25 and extends upward from the arm 34 at approximately a ninety degree angle from the bottom support members 42 and 44. The side support member 56 is shown in FIG. 2 as having a generally A-shape, however, it should be understood that the side support member 56 can be another shape, size, or configuration, depending on the application of the storage rack (i.e. the shape of the load 16). Also, although the side support member 56 is shown as extending from the arm 34 of the swing arm assembly 26, it should be understood that the side support member 56 can be connected indirectly to the swing arm assembly 26. For example, spacers or other structures can be positioned in between the swing arm assembly 26 and the side support member 56. Alternatively, the side support member 56 can extend from at least one of the bottom support structures 42 and 44. Further, the angle at which the side support member 56 extends from the arm 34 of the swing arm assembly 26 can vary.

In one preferred embodiment, the first bottom support member 42, the second bottom support member 44, the side support member 56, and the arm 34 of the swing arm assembly 26 are formed separately and then connected together by any suitable mounting assembly, such as welding, brackets, male-to-female connections, or the like. Alternatively, the first bottom support member 42, the second bottom support member 44, the side support member, and the arm of the swing arm assembly 26 (or combinations thereof) can be formed integrally to form a unitary structure.

The first bottom support member 42, the second bottom support member 44, and the side support member 56 are desirably constructed of very rigid materials so that the first bottom support member 42, the second bottom support member, and/or the side support member 56 can support the load 16 while the vehicle 14 is in motion. In one preferred embodiment, the first bottom support member 42 and the second bottom support member 44 are constructed of 1½ inch outside diameter steel square tubing with a sidewall thickness in the range of about 3/16 inches to ¼ inches, and the side support member 56 is constructed of 1½ inch outside diameter steel square tubing with a sidewall thickness in the range of about 3/16 to ⅛ inches. However, it should be understood that the first bottom support member 42, the second bottom support member 44, and the side support member 56 can be constructed of other types of rigid material, such as glass reinforced plastics, and be of different sizes, shapes or configurations of solid material or tubing.

Preferably, the load 16 is secured to the platform 40 so that the load 16 will not inadvertently disengage or lose support from the vehicle 14. For example, as shown best in FIG. 1, a first strap 180 can be wrapped around a portion of the load 16 and the platform 40 and held in place by a first fastener 182 connected to the platform 40. Also, as shown best in FIG. 3, a second strap 184 can be wrapped around a portion of the load 16 and the platform 40 and held in place by a second fastener 186 connected to the platform 40. Preferably, the first strap 180 and the second strap 184 are wrapped around the load 16 and platform 40 and held in place such the first strap 180 and second strap 184 secure the load 16 to the platform both horizontally and vertically. However, it should be understood that the load 16 can be secured to the platform 40 in any manner.

Figure 4:
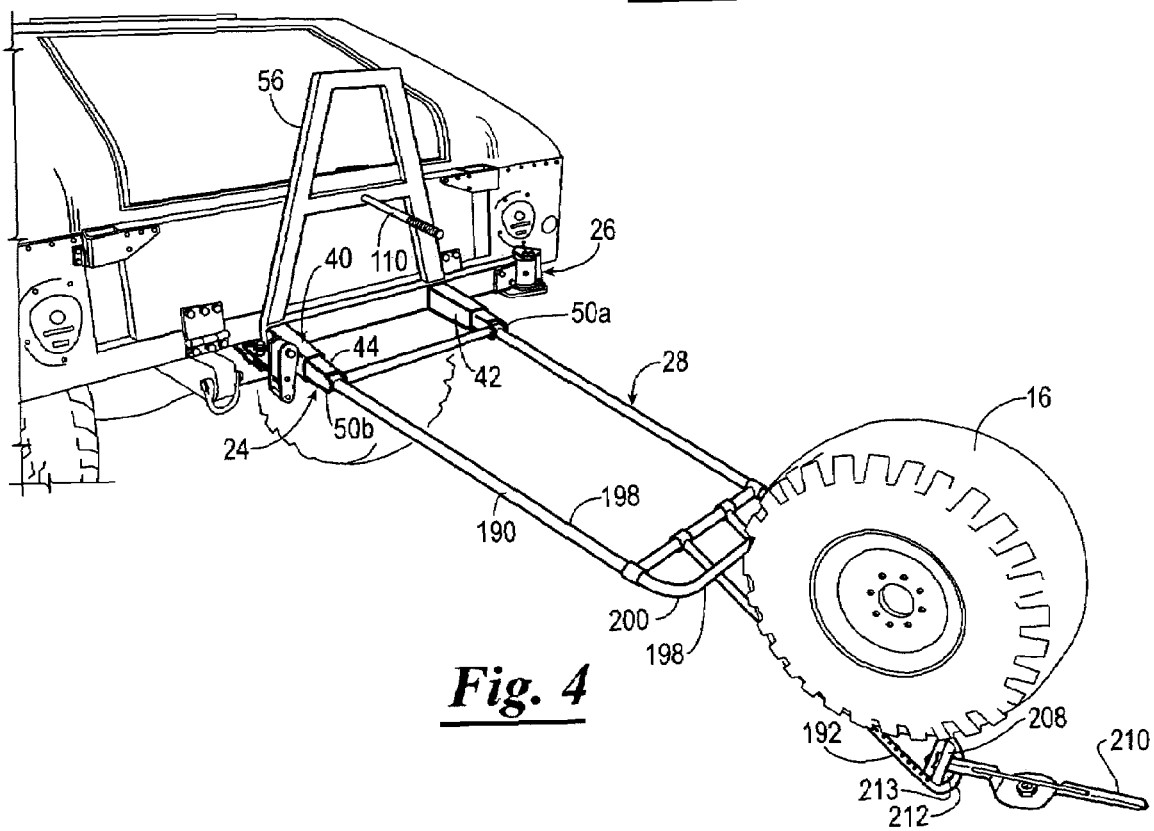
FIGS. 4-7 cooperate to illustrate one method of utilizing the storage rack for assisting in lifting a load onto the storage rack. Each of FIGS. 4-7 will be described separately hereinafter.

Referring now to FIG. 4 in combination with FIG. 1, the lift assembly 28 will now be described in more detail. In general, the lift assembly 28 is provided with a lift member 190, and a lever 192. Preferably, the lift member 190 is pivotally connected to the platform 40 of the load supporting structure 24. However, it should be understood that the lift member 190 may alternatively be connected to the swing arm assembly 26. In the embodiment depicted in FIG. 4, the lift member 190 is pivotally attached to the first end 50*a* of the first bottom support member 42 and a first end 50*b* of the second bottom support member 44 of the platform 40. The connection between the lift member 190 and the platform 40 can be formed from any suitable assembly, such as by passing a smooth rod, or a threaded rod through a portion of the lift member 190. Alternatively, a ball bearing assembly, or other type of hinge could be used.

The lever 192 is movably connected to the lift member 190 so as to permit the lift assembly 28 to be folded to a folded position, as shown in FIG. 1, and then moved to an extended position as shown in FIG. 4. In one preferred embodiment, the lever 192 is attached to the lift member 190 via a pivotal connection, such as a hinge, bearing assembly, or other suitable type of pivotal or movable connection. The lever 192 is connected to the lift member 190 near a distal end 200 of the lift member 190. The lever 192 extends past the distal end 200 of the lift member 190 when the lever 192 is in the extended position. Preferably, the lever 192 and the lift member 190 are arranged such that the lift member 190 engages the lever 192 in the extended position to prevent further pivotation of the lever 192 relative to the lift member 190.

In one preferred embodiment, the lift member 190 and the lever 192 are formed as web structures from a plurality of connected rods 198. For both the lift member 190 and the lever 192, the rods 198 are, in general, arranged in a rectangular configuration and connected to each other at the ends thereof. However, it should be understood that the particular shape of the lift member 190 and/or the lever 192 can vary. For example, the lift member 190 and lever 192 can have a circular shape, triangular shape, or any other symmetrical, asymmetrical, or fanciful shape. When the storage rack 10 is to be used in combination with the load 16 being a tire, the lift member 190 and lever 192 can be shaped so as to substantially correspond to the shape of at least a portion of the tire.

In general, the lever 192 is designed to form a ramp capable of facilitating upward, or vertical movement of the load 16. Although the lever 192 has been shown and described herein as a web structure formed of interconnected rods, or bars, it should be understood that the lever 192 could be formed of a solid structure, or two are more structures connected together to form a solid structure. For example, a mesh based substance could be installed on the lever 192 to facilitate the lever 192 functioning as a ramp.

Figure 5:
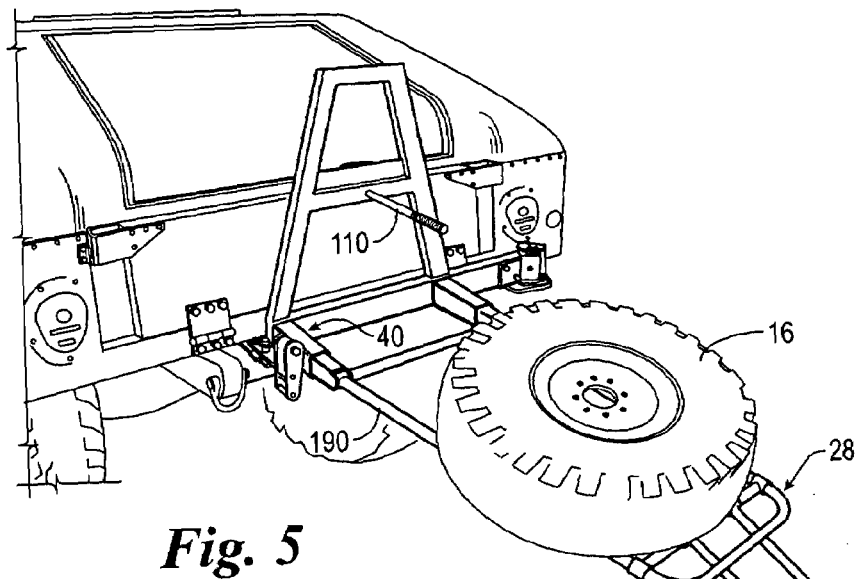
Figure 6:
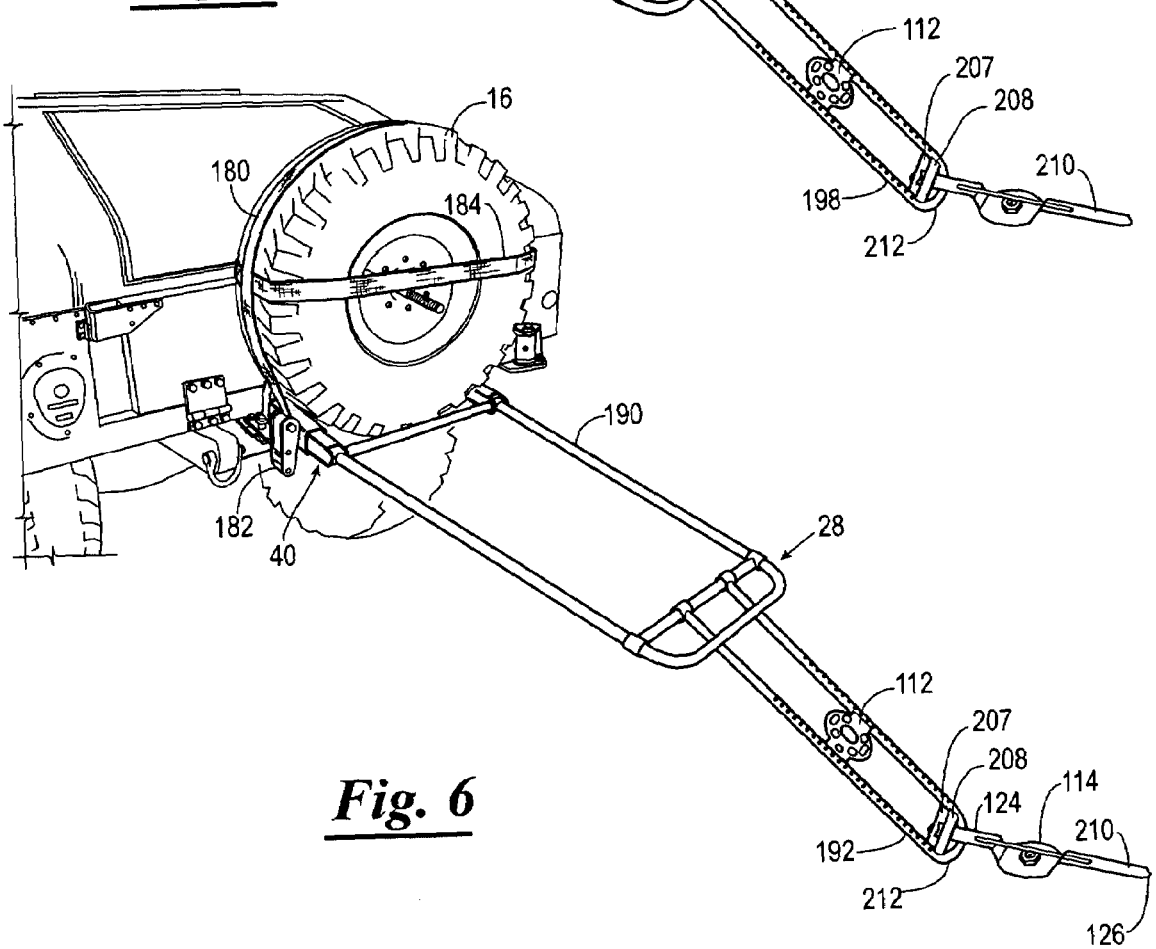

To load the load 16 onto the load supporting structure 24 when the lift assembly 28 is in the extended position, as depicted in FIG. 4, at least a portion of the load 16 is positioned onto the lever 192. The load 16 is then moved across the lever 192 up to the lift member 190, as depicted in FIG. 5. For example, when the load 16 is the tire, the tire can be rolled up the lever 192 to the lift member 190. Once the load 16 is rolled up the lever 192, the load 16 may then be rotated approximately ninety degrees and positioned on the lift member 190 as shown in FIG. 5. In this position, the lever 192 is gripped by a user and then lifted to place the load 16 onto the platform 40 as shown in FIG. 6.

In one embodiment, to assist in lifting the lever 192 and placing the load 16 onto the platform 40, the lift assembly 28 of the storage rack 10 can further comprise a first handle plate 207 and a second handle plate 208 connected to the lever 192 and disposed opposite the connection of the lever 192 to the lifting member 190. The first handle plate 207 has a hole formed therethrough so that the first handle plate 207 is adapted to receive an extension handle 210, as shown for example in FIGS. 5-6. The second handle plate 208 is spaced a distance from the distal end 212 of the lever 192 so as to provide an opening through which the extension handle 210 can be positioned between the second handle plate 208 and the distal end 212 of the lever 192 and inserted into the hole of the first handle plate 207. The first handle plate 207 and the second handle plate 208 are arranged so that when the extension handle 210 is inserted and the user lifts the extension handle 210, the extension handle 210 engages the first and second handle plates 207 and 208 so as to prevent from further pivotation of the extension handle 210 relative to the lever 192. As such, the first and second handles plates 207 and 208 allow the extension handle 210 to cooperate with the lever 192 and extend past a distal end 212 of the lever 192 so as to add more distance from the load 16 from which the user can grip and apply force to lift the lever 192 and place the load 16 onto the platform 40 (i.e., to provide additional leverage), thereby reducing the amount of force needed to raise the lift assembly 28 when a load 16 is present.

Although the lift assembly 28 is described herein as having the first handle plate 207 and second handle plate 208 which receive the extension handle 210, it should be understood that lift assembly 28 can be provided with other structures to receive the extension handle 210 so that the extension handle 210 can be used to assist in lifting the lever 192 and placing the load 16 onto the platform 40. For example, the lift assembly 28 can include the first handle plate 207 and a connector (not shown), such as a bolt, hinge, weld or the like, so that the extension handle 210 can be connected to the handle plate. In yet another embodiment, the handle plate can include a projection (not shown) shaped to receive the extension handle 210. For example, the projection can be a hexagonal nut when the extension handle 210 is a tire iron having a hexagonal end.

Figure 7:
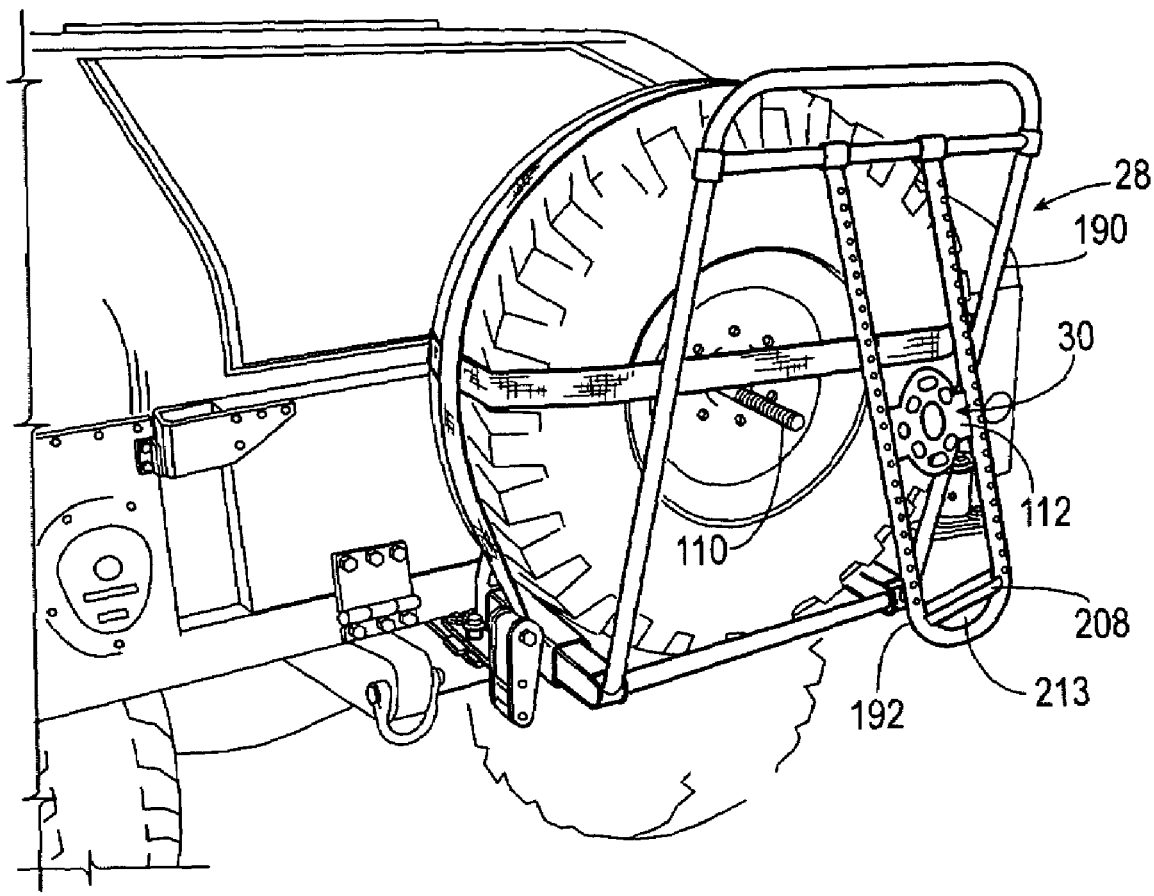

Once the load 16 is in positioned on the platform 40, the lever 192 can then be moved to a folded position in order to secure the load 16, as shown in FIG. 7 and FIG. 1. Similarly, to unload the load 16, the process discussed above is generally reversed.

To further secure the load 16 into the storage rack 10, the storage rack 10 is provided with the locking assembly 30, which may also function as an antitheft device. The locking assembly 30 is provided with a locking member 110, a locking plate 112, and a stop member 114. The locking member 110 is supported by the load supporting structure 24, as shown best in FIG. 2. However, the locking member 110 can also be supported by the swing arm assembly 26 or the lift assembly 28. In one preferred embodiment, the locking member 110 is supported by the side support member 56 of the platform 40. Preferably, the locking member 110 is connected to the side support member 56 and extends therefrom so as to extend through at least a portion of the load 16 when the load 16 is positioned onto the load supporting structure 24, as shown best in FIG. 6. For example, when the load 16 is the tire and the rim, the locking member 110 is positioned to extend through at least a portion of the rim.

In one embodiment, the locking plate 112 is supported by the lever 192 of the lift assembly 28. In this regard, the locking plate 112 is provided with a hole 120 formed there through. The hole 120 of the locking plate 112 is generally aligned with the opening formed through the rim of the tire. The locking member 110 extends through the opening in the rim, and also extends through the hole 120 formed in the locking plate 112 such that a distal end 122 of the locking member 110 projects from the locking plate 112. As best shown in FIG. 1, the stop member 114 is positioned on the locking member 110 near the distal end 122 thereof for securing the load 16 on to the load supporting structure 24. In one embodiment, the distal end 122, and/or the portion of the locking member 110 near the distal end 122 is a threaded structure. In this example, the stop member 114 is also threaded so as to be able to be threaded onto the locking member 110. Although the interconnection between the locking member 110 and the stop member 114 has been shown and described as threads, it should be understood that the locking member 110 and the stop member 114 can be secured to each other in any suitable fashion, such as for example using a rachet and nut, or the like. Further, it should be understood that the main function of the locking assembly 30 is to maintain the load 16 on the load supporting structure 24, and thus the locking assembly 30 can be constructed in any manner capable of maintaining the load 16 on the load supporting structure 24.

As an optional feature, the stop member 114 can be provided with a pair of handles 124 and 126 extending from a central portion 118 of the stop member 114. In this regard, the handles 124 and 126 facilitate the tightening of the stop member 114 onto the locking member 110. Further, in one embodiment, the stop member 114 and the extension handle 210 discussed above in conjunction with the lift assembly 28 can be combined into the same component so as reduce parts and to simplify the storage rack 10. In such an embodiment, the first handle plate 207 can be adapted to receive a portion of the stop member 114, such as for example the handle 124, and then an opposing portion of the stop member 114, such as for example handle 126, can be gripped by the user to apply force to lift the lever 192 and place the load 16 onto the platform 40. However, it should be understood that the stop member 114 and extension handle 210 can also be separate components.

As best shown in FIG. 2, the storage rack 10 can further include a latching assembly 150 to releasably secure the storage rack 10 to the vehicle 14 when the storage rack 10 is in the closed position, as shown best in FIGS. 1-2. In one embodiment, the latching assembly 150 includes a first latching plate 155 connected to the vehicle 14, a second latching plate 157 connected to the second bottom support 44 of the platform 40 of the load supporting structure 24. The first latching plate 155 and the second latching plate 157 are positioned such that when the storage rack 10 is in the closed position, at least a portion of the first latching plate 155 and second latching plate 155 overlap. The portions of the first latching plate 155 and second latching plate 157 which overlap can have a hole (not shown) formed there through such that a fastener 160 (e.g., a bolt and bolt) can be inserted through the first and second latching plates 155 and 157 to connect the first and second latching plates 155 and 157.

Although the latching assembly 150 has been described herein as including the first and second latching plates 155 and 157 and fastener 160, it should be understood that the latching assembly 150 can be any latch capable of releasably connecting the storage rack 10 to at least a portion of the vehicle 14 (or structure attached thereto). For example, the latching assembly 150 can include a bar that fits into a notch or slot on the vehicle 14 or a structure attached thereto. Also, although the fastening assembly 150 is described as being connected to the second bottom support member 44 of the load support structure 24, it should be understood that the fastening assembly 150 can also be associated with other portions of the load support structure 24, the lift assembly 28, or the swing arm assembly 26. For example, the latching assembly 150 can be connected to the second end 38 of the arm 34 of the swing arm assembly 26.

The storage rack 10 can also include additional features to facilitate the loading and support of the load 16. For example, the lift assembly 28 of the storage rack 10 can be provided with a pair of guides (not shown) which are permanently or removably connected to the lift member 190 to help guide the load 16 onto the lift member 190, as described in more detail in the co-pending patent application identified by U.S. Ser. No. 10/687,982. Also, the storage rack 10 may further have an optional holding assembly (not shown) for receiving and providing additional storage for items (e.g., a gas can, water storage bottle, or other type of container), as described in more detail in the co-pending patent application identified by U.S. Ser. No. 10/687,982. Further, the storage rack 10 can also include features to facilitate moving the storage rack 10 in between the open and closed position. For example, the storage rack 10 can include a handle bar (not shown) so that the user can grip the handle bar to move the storage rack 10 between the open or closed positions.

The storage rack 10 of the present invention may be sold as an assembled unit or as a kit which can be easily and rapidly mounted onto the vehicle 14, such as the HMMWV. Modification of the HMMWV is typically unnecessary or at a minimum. However, additional support members or extensions can be used to mount and support the storage rack 10 on the vehicle 14.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A storage rack connectable to a mounting structure of a vehicle for supporting a tire, comprising:

a load supporting structure adapted to support the tire when the tire is associated with the load supporting structure;

a swing arm assembly connected to the load supporting structure, the swing arm assembly being attachable to the mounting structure of the vehicle and adapted to permit the storage rack to move between an open position and closed position; and a lift assembly for facilitating lifting of the tire to the load supporting structure whereby the tire can be supported by the load supporting structure and thus the vehicle when the swing arm assembly connects the load supporting structure to the mounting structure of the vehicle, and wherein the lift assembly comprises:

a lift member pivotally connected to the load supporting structure; and a lever connected to the lift member so as to permit the lift assembly to be folded to a folded position and moved to an extended position, the lever forming a ramp when the lever is positioned in the extended position whereby the tire can be rolled up the ramp formed by the lever and subsequently lifted to the load supporting structure by movement of the lift member toward the load supporting structure by lifting the lever.

2. The storage rack of claim 1 wherein the swing arm assembly comprises:

an arm having a first end and a second end with a distance extending there between, wherein the arm is connected to the load supporting structure; and a hinge assembly connectable to the mounting structure of the vehicle and the first end of the arm, the hinge assembly adapted for pivotal movement of the arm generally about an axis substantially parallel with the side of the vehicle.

3. The storage rack of claim 2, wherein the hinge assembly comprises:

a pivoting member connected to a first end of the swing arm, the pivoting member having an opening formed there through, the opening having a first open end and a second open end;

a first bushing and a second bushing, each bushing having a sleeve portion, a flanged portion extending outwardly from the sleeve portion, and an opening formed through the sleeve portion and flanged portion, wherein the sleeve portion of the first bushing is inserted into the first open end of the opening of the pivoting member and the flanged portion of the first bushing is adapted so as to prevent passage of the flanged portion of the first bushing through the opening of the pivoting member, and wherein the sleeve portion of the second bushing is inserted into the second open end of the opening of the pivoting member and the flanged portion of the second bushing is adapted so as to prevent passage of the flanged portion of the second bushing through the opening of the pivoting member;

a yoke connectable to the mounting structure of the vehicle, the yoke having a bottom platform, a top platform opposing the bottom platform, and a brace member extending between the bottom platform and top platform, the bottom platform having a hole adapted to prevent passage of the flanged portion of the second bushing there through, the top platform having a hole adapted to prevent passage of the flanged portion of the first bushing therethrough, and wherein the pivoting member and inserted first bushing and second bushing are positioned in between the bottom platform and top platform;

a pin having a shaft and a shoulder extending outwardly from the shaft, the shaft of the pin being inserted up through the hole of the bottom platform, the opening of the second bushing, the opening of the pivoting member, the opening of the first bushing, and the hole of the top platform, the shoulder of the pin being adapted to prevent passage of the shoulder through the hole of the bottom platform, and wherein the pin is maintained generally stationary with respect to the yoke and the pivoting member is rotatable about at least a portion of the pin; and a pin locking member removably engaging the pin, the pin locking member adapted to prevent the pin from moving from the yoke once the pin has been inserted through the yoke, the first and second bushings, and the pivoting member and the pin locking member has engaged the pin.

4. The storage rack of claim 3, wherein the pin further comprises a threaded hole formed through at least a portion of the shaft of the pin, the threaded hole disposed opposite the shoulder of the pin, and the pin locking member comprises a threaded bolt having a head adapted to prevent passage of the head through the hole of the top platform and a threaded end which can be disposed through the hole of the top platform and screwed into the threaded hole of the pin so as to engage the pin.

5. The storage rack of claim 4, wherein the pin locking member causes the shaft of the pin to expand generally adjacent to the portion of the threaded end of the pin locking member which is screwed into the threaded hole of the pin.

6. The storage rack of claim 5, wherein the threaded end of the pin locking member is screwed into the threaded hole of the pin such that the head of the pin locking member presses against the top platform of the yoke and the shoulder of the pin presses against the bottom platform of the yoke.

7. The storage rack of claim 3, wherein the hinge assembly further comprises a spacer disposed between at least one of the pin and the bottom platform, the bottom platform and the second bushing, the second bushing and the pivoting member, the pivoting member and the first bushing, the first bushing and the top platform, or the top platform and the pin locking member.

8. The storage rack of claim 3, wherein the yoke is connectable to the mounting structure of the vehicle via a mounting plate.

9. The storage rack of claim 8, wherein the mounting plate is connected to a bottom platform of the yoke and is adapted to further prevent the pin from moving from the yoke once the pin has been inserted through the yoke, the first and second bushings, and the pivoting member.

10. The storage rack of claim 1 wherein the load support structure comprises a platform having at least one bottom support member and at least one side support member, and wherein the lift member is connected to the at least one bottom support member of the platform of the load support structure.

11. The storage rack of claim 10 wherein the lift member is pivotally connected to the at least one bottom support member of the platform.

12. The storage rack of claim 1 wherein the lever is connected to the lift member near a distal end of the lift member.

13. The storage rack of claim 12 wherein the lever is pivotally connected to the lift member.

14. The storage rack of claim 12, further comprising an extension handle connectable to the lifting assembly, the extension handle extending past a distal end of the lever opposite the connection of the lever and the lift member, wherein the extension handle can be gripped by a user to apply force to the lever.

15. The storage rack of claim 14, wherein the lifting assembly further comprises a handle plate disposed opposite the connection of the lever and the lift member, the handle plate adapted to receive the extension handle.

16. The storage rack of claim 1, further comprising a latching assembly connected to at least one of the load supporting structure, swing arm assembly, or lift assembly, the latching assembly adapted to releasably secure the storage rack to the vehicle when the storage rack is in the closed position.

* * * * *